2,715,084

MODIFIED ROSIN SOLDERING FLUX

Otto König, New York, N. Y., assignor to National Lead Company, New York, N. Y., a corporation of New Jersey No Drawing. Application February 7, 1952, Serial No. 270,530

6 Claims. (Cl. 148—23)

The invention relates to a soldering flux, and more particularly, to a non-corrosive rosin flux.

Flux for soldering has heretofore been composed of a number of chemical substances of which the acid or halide salt fluxes, for instance, hydrochloric acid or ammonium chloride have been found very effective. This acid or halide salt flux should not be employed, however, where possibility of corrosion may result, as for instance, when employed in electrical arts. To avoid this disadvantage, rosin fluxes have been widely used under such conditions. Rosin does not possess corrosive tendencies, but it is not as effective in cleaning dirty or oxidized metal surfaces as are the stronger acting acid or halide fluxes. For this reason, rosin flux as generally used, has been characterized by producing relatively poor spreading properties. Thus, while the corrosive tendencies of the acid flux have been avoided, the rosin fluxes have resulted in appreciable less fluxing action and spreading of the solder over the surfaces to be jointed.

Recently, there have been proposed certain activated rosin fluxes containing organic base halides such as substituted ammonium halides, for instance cetyl-pyridinium halide, which, when added to rosin, provide a flux possessing reasonably non-corrosive properties coupled with a definite increase in spreading power over straight rosin flux. In such fluxes, however, the halide is nevertheless present as an anion and under certain conditions, tends to hydrolyze in moist air to form a corrosive acid halide. These types of fluxes have another very undesirable property. They are toxic in themselves and at soldering temperatures the organic bases decompose to produce noxious and toxic fumes or gases.

The object of this invention is to produce activated non-corrosive rosin fluxes with greatly increased flow characteristics. A further object is to produce activated non-corrosive rosin fluxes that are non-toxic and do not break down into toxic products. Another object is to produce solder fluxes which combine the characteristics of good spreading properties, non-corrosive characteristics with no toxic or noxious break down products at elevated temperatures. These and other objects of this invention will become apparent from the following, more complete and detailed description thereof.

In its broadest aspects, the flux of the present invention comprises an intimate mixture of rosin and a small proportion of a chain brominated, aliphatic carboxylic acid containing from 8 to 24 carbon atoms in the chain or the ammonium or alkali metal salt thereof. Compounds of less than 8 carbon atoms tend to become corrosive and have less surface activity. Compounds of over 24 carbon atoms are not generally available and are not as effective. Particularly useful among the acids are alphabromolauric, alphabromomyristic, alphabromopalmitic and hexabromostearic.

The organic compound contained in the flux of the present invention possesses bromine combined in the chain of the organic compound. In this position it is not ionic and therefore these compounds will not readily break down and hydrolyze to form corrosive halides. The effect on the spreading power and general fluxing properties of rosin, however, is equal to the best results heretofore obtained. Furthermore, the compounds contained in the flux of the present invention do not decompose at soldering temperature to produce noxious and toxic fumes or gases.

The soldering flux of the present invention comprises an intimate mixture of the rosin and the organic compound described above. This mixture may preferably be obtained by adding first a small amount of turpentine to plasticize the rosin base, heating this mixture until molten and then adding the organic compound, stirring these until an intimate mixture of these ingredients is obtained. The resulting flux, after cooling, was found to be of good flux consistency and to possess excellent spreading characteristics. The organic compound employed in the flux of the present invention should be present in amount from 0.10 to 5.0% of the weight of the rosin. Less than this 0.10% will not provide sufficient modification of the properties of the original rosin to produce a solder with the improved spreading power. More than 5.0% is difficult to incorporate, results in excessive costs to the finished flux and, by being present in excess, reduces the effective amount of rosin and thereby reduces the total available fluxing effect. It is preferable however, to employ the organic compound in about 1% by weight of the rosin.

As examples of the products of this invention, the following flux compositions were formulated and tested:

EXAMPLE 1

91.5 grams of pure, water-white rosin were heated with 7.5 grams of turpentine until molten and then 1 gram of alphabromolauric acid was stirred into this mixture until dissolved. The mixture on cooling was found to be of good flux consistency.

EXAMPLE 2

The flux was prepared by the same procedure as described in Example 1 except that 0.4 gram of alphabromomyristic acid was substituted for the alphabromolauric acid employed in Example 1.

EXAMPLE 3

The flux was prepared by the same procedure as described in Example 1 except that 1 gram of alphabromopalmitic acid was substituted for the alphabromolauric acid employed in Example 1.

EXAMPLE 4

The flux was prepared by the same procedure as described in Example 1 except that 1 gram of hexabromostearic acid was substituted for the alphabromolauric acid employed in Example 1.

EXAMPLE 5

The flux was prepared by the same procedure as described in Example 1 except that 1 gram of the bromination products of linoleic acid was substituted for the alphabromolauric acid employed in Example 1.

EXAMPLE 6

The flux was prepared by the same procedure as described in Example 1 except that 1 gram of the potassium salt of alphabromolauric acid was substituted for the alphabromolauric acid employed in Example 1.

EXAMPLE 7

The flux was prepared by the same procedure as described in Example 1 except that 1 gram of the ammonium salt of alphabromolauric acid was substituted for the alphabromolauric acid employed in Example 1.

The flux compositions according to the invention as described in Examples 1–7 above were tested in comparison with pure rosin and a previously known rosin organic compound combination as follows:

Flux was applied to a surface of 1½″ x 1½″ on a copper sheet of 1/32″ thickness, and then 0.52 gram of 50% lead-50% tin solder was placed on the fluxed surface in the form of a button. Heat was then applied with a Bunsen burner underneath the copper plate until the solder had just melted and the heat was withdrawn. Observations were made of any noxious and toxic break-down products at soldering temperature. The area covered by the molten solder was measured by a planimeter and thus shown as an indication of spreading power. The copper plates were then exposed to an atmosphere of 100% humidity at a temperature of 100° C. for 240 hours to test for corrosive effects. The following table, Table 1, compares the spreading power, degree of corrosion and also the presence and strength of fumes and gases evolved during melting of the solder for the products of Examples 1–7, tested as noted on the preceding pages, compared with pure rosin, and rosin containing cetyl-pyridinium iodide:

*Table 1*

| Flux Employed | Flow Area, Sq. Inches | Corrosive Effect | Noxious and Toxic Breakdown Products |
|---|---|---|---|
| Example 1 | .67 | None | None. |
| Example 2 | .57 | do | Do. |
| Example 3 | .65 | do | Do. |
| Example 4 | .54 | Very Slight | Do. |
| Example 5 | .57 | do | Do. |
| Example 6 | .53 | None | Do. |
| Example 7 | .60 | do | Do. |
| Rosin | .30 | do | Do. |
| Cetyl-pyridinium Iodide | .59 | do | Copious. |

It will be noted that the solder fluxes of this invention, Examples 1–7, showed excellent spreading characteristics, substantially no corrosion and no production of noxious or toxic fumes during the solder melting process. On the other hand, the pure rosin solder showed only about one-half the spreading power while possessing comparable corrosion resistance and fuming characteristics. The solder flux containing the cetyl-pyridinium iodide showed comparable spreading characteristics and little corrosive effect, but quantities of noxious and toxic fumes were given off during the melting of the solder.

The solder flux of this invention has the advantage of producing a combination of desirable characteristics not found in prior art flux compositions.

While this invention has been described and illustrated by the examples shown, it is not intended to be strictly limited thereto and other modifications and variations may be employed within the scope of the following claims.

I claim:

1. A soldering flux consisting essentially of an intimate mixture of rosin and a small portion from 0.1% to 5.0% by weight of rosin of an organic compound selected from the group consisting of chain brominated, aliphatic carboxylic acids, having from 8 to 24 carbon atoms in the chain, and ammonium and alkali metal salts of said acids.

2. A soldering flux consisting essentially of an intimate mixture of rosin and a small portion of about 1% by weight of rosin of an organic compound selected from the group consisting of chain brominated, aliphatic carboxylic acids, having from 8 to 24 carbon atoms in the chain, and ammonium and alkali metal salts of said acids.

3. A soldering flux according to claim 1 in which the organic compound is alphabromomyristic acid.

4. A soldering flux according to claim 1 in which the organic compound is alphabromolauric acid.

5. A soldering flux according to claim 1 in which the organic compound is hexabromostearic acid.

6. A soldering flux according to claim 1 in which the organic compound is alphabromopalmitic acid.

References Cited in the file of this patent

UNITED STATES PATENTS

| 1,882,735 | Barber | Oct. 18, 1932 |
| 2,429,033 | Silman et al. | Oct. 14, 1947 |

FOREIGN PATENTS

| 482,510 | Great Britain | Mar. 29, 1938 |
| 484,988 | Great Britain | May 9, 1938 |
| 713,719 | Germany | Nov. 13, 1941 |
| 726,159 | Germany | Oct. 12, 1942 |